(12) United States Patent
Drake (10) Patent No.: US 10,504,384 B1
(45) Date of Patent: Dec. 10, 2019

(54) AUGMENTED REALITY USER ENGAGEMENT SYSTEM (71) Applicant: Haier US Appliance Solutions, Inc., Wilmington, DE (US)

(72) Inventor: Jeff Donald Drake, Louisville, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 0 days.

(21) Appl. No.: 16/158,372

(22) Filed: Oct. 12, 2018

(51) Int. Cl.
G06T 19/00 (2011.01)
G09B 19/00 (2006.01)
F24C 7/08 (2006.01)

(52) U.S. Cl.
CPC .......... G09B 19/0092 (2013.01); F24C 7/082 (2013.01); G06T 19/006 (2013.01)

(58) Field of Classification Search
CPC .... G09B 19/0092; G06T 19/006; F24C 7/082
See application file for complete search history.

(56) References Cited

U.S. PATENT DOCUMENTS 9,791,936 B1* 10/2017 Kovach ................. G06F 3/017
2002/0171674 A1 11/2002 Paris
2010/0030578 A1* 2/2010 Siddique ............ G06Q 10/0637
705/3
2012/0127284 A1* 5/2012 Bar-Zeev ............. G02B 27/017
348/53
2017/0243515 A1* 8/2017 Vengroff ................ A47J 27/62

FOREIGN PATENT DOCUMENTS

CN 106294610 A 1/2017
CN 106774877 A 5/2017
CN 107807554 A 3/2018

OTHER PUBLICATIONS

Bonanni et al. CounterIntelligence: Augmented Reality Kitchen, Dec. 2005, p. 1-7 (Year: 2005).*

* cited by examiner

Primary Examiner — Robert J Craddock
(74) Attorney, Agent, or Firm — Dority & Manning, P.A.

(57) ABSTRACT

A user engagement system and methods for use thereof in an augmented reality context are provided herein. The user engagement system may include a camera assembly, an image monitor, and a controller. The camera assembly may be directed at a cooking zone. The image monitor may be directed at an area forward from the cooking zone. The controller may be in operative communication with the camera assembly and the image monitor. The controller may be configured to initiate a directed cooking operation. The directed cooking operation may include receiving a video signal of the cooking zone from the camera assembly, presenting a real-time feed of the cooking zone at the image monitor, overlaying a dynamic figure onto the real-time feed of the cooking zone at the image monitor, and animating the dynamic figure over the real-time feed based on a selected recipe.

16 Claims, 6 Drawing Sheets

AUGMENTED REALITY USER ENGAGEMENT SYSTEM

FIELD OF THE INVENTION

The present subject matter relates generally to systems and methods for user engagement during cooking operations or near a cooking appliance.

BACKGROUND OF THE INVENTION

Cooking appliances, such as cooktop or range appliances generally include heating elements for heating cooking utensils, such as pots, pans and griddles. A variety of configurations can be used for the heating elements located on the cooking surface of the cooktop. The number of heating elements or positions available for heating on the range appliance can include, for example, four, six, or more depending upon the intended application and preferences of the buyer. These heating elements can vary in size, location, and capability across the appliance.

Recipes or prepared instructions for cooking a specific food item have been a long-standing staple of all types of cooking. Although some individuals are able to cook without the aid of any prepared list of steps, many individuals require a specific set of instructions in order to cook or prepare a desired food item. These recipes may be provided in books, cards, and increasingly, on an electronic user device. A website or software application (i.e., "app") may present a recipe as a dynamic or interactive set of instructions, which many users find easier to understand than a generic printed or text-based recipe.

Unfortunately, existing systems can provide an unsatisfactory user experience and can inhibit a user's desired interactions with a cooking appliance. Recipe books are often cumbersome and difficult to use while cooking. Pages may rip, stain, burn, or become otherwise damaged during use. Moreover, printed materials do not allow for immediate real-time guidance or information. Electronic user devices that are connected to the Internet, such as a computer, tablet or smartphone, may allow for immediate interaction with remote information servers or individuals. However, such devices are generally not suitable for use in tandem with a cooking appliance. A user may be forced to repeatedly move away from the cooking appliance in order to view the device or provide any input instructions. Moreover, the extreme environment near a cooking appliance may risk damaging the device. If a user is following a recipe, the user must often look away from the cooking appliance and read how the cooking appliance is to be used (e.g., the temperature at which the cooking appliance must be set), and then manually direct the cooking appliance accordingly. This may be true regardless of whether the recipe is provided in a book, on an electronic user device, or elsewhere. Although cooking appliances and cooking areas can vary greatly, it is generally up to the user to ensure that the instructions are followed correctly.

As a result, improved systems are needed for facilitating user engagement and interaction during use of a cooking appliance. In particular, it may be advantageous to provide a user engagement system is provides guided cooking instructions based on the actual cooking environment being used.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a user engagement system is provided. The user engagement system may include a camera assembly, an image monitor, and a controller. The camera assembly may be directed at a cooking zone. The image monitor may be directed at an area forward from the cooking zone. The controller may be in operative communication with the camera assembly and the image monitor. The controller may be configured to initiate a directed cooking operation. The directed cooking operation may include receiving a video signal of the cooking zone from the camera assembly, presenting a real-time feed of the cooking zone at the image monitor according to the received video signal, overlaying a dynamic figure onto the real-time feed of the cooking zone at the image monitor, and animating the dynamic figure over the real-time feed based on a selected recipe.

In another exemplary aspect of the present disclosure, a method of operating a user engagement system is provided. The method may include receiving a video signal of a cooking zone from a camera assembly. The method may also include presenting a real-time feed of the cooking zone at an image monitor according to the received video signal. The method may further include overlaying a dynamic figure onto the real-time feed of the cooking zone at the image monitor, and animating the dynamic figure over the real-time feed based on a selected recipe.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). The terms "first," "second," and "third" may be used interchangeably to distinguish one component from another and are not intended to signify location or importance of the individual components.

Generally, the present disclosure provides methods and systems for privately displaying or animating a dynamic figure provide guidance to a user who is following a selected recipe. The dynamic figure may be displayed over a real-time video feed of a cooking zone and thereby provide an augmented reality experience for the user.

As shown cooking appliance 300 defines a vertical direction V, a lateral direction L, and a transverse direction T, for example, at a cabinet 310. The vertical, lateral, and transverse directions are mutually perpendicular and form an orthogonal direction system. As shown, cooking appliance 300 extends along the vertical direction V between a top portion 312 and a bottom portion 314; along the lateral direction L between a left side portion and a right side portion; and along the traverse direction T between a front portion and a rear portion.

Turning to the figures, FIGS. 1 through 5 provide various views of a system 100 (or portions thereof) according to exemplary embodiments of the present disclosure. System 100 generally includes a stationary interactive assembly 110 with which a user may interact or engage. Interactive assembly 110 may have a controller 510A that is in operable communication with an image monitor 112 and one or more camera assemblies (e.g., camera assembly 114A and camera assembly 114B) that are generally positioned above a cooking appliance 300.

Cooking appliance 300 can include a chassis or cabinet 310 that defines a cooking zone 320 wherein one or more cooking operations may be performed by a user (e.g., heating or preparing food items according to a recipe). For example, the cooking zone 320 may be defined by a cooktop surface 324 of the cabinet 310. As illustrated, cooktop surface 324 includes one or more heating elements 326 for use in, for example, heating or cooking operations. In exemplary embodiments, cooktop surface 324 is constructed with ceramic glass. In other embodiments, however, cooktop surface 324 may include another suitable material, such as a metallic material (e.g., steel) or another suitable non-metallic material. Heating elements 326 may be various sizes and may employ any suitable method for heating or cooking an object, such as a cooking utensil 322, and its contents. In one embodiment, for example, heating element 326 uses a heat transfer method, such as electric coils or gas burners, to heat the cooking utensil 322. In another embodiment, however, heating element 326 uses an induction heating method to heat the cooking utensil 322 directly. In turn, heating element 326 may include a gas burner element, resistive heat element, radiant heat element, induction element, or another suitable heating element.

In some embodiments, cooking appliance 300 includes an insulated cabinet 310 that defines a cooking chamber 328 selectively covered by a door 330. One or more heating elements 332 (e.g., top broiling elements or bottom baking elements) may be enclosed within cabinet 310 to heat cooking chamber 328. Heating elements 332 within cooking chamber 328 may be provided as any suitable element for cooking the contents of cooking chamber 328, such as an electric resistive heating element, a gas burner, microwave element, halogen element, etc. Thus, cooking appliance 300 may be referred to as an oven range appliance. As will be understood by those skilled in the art, cooking appliance 300 is provided by way of example only, and the present subject matter may be used in any suitable cooking appliance 300, such as a double oven range appliance, standalone oven, or a standalone cooktop (e.g., fitted integrally with a surface of a kitchen counter). Thus, the example embodiments illustrated in figures are not intended to limit the present subject matter to any particular cooking chamber or heating element configuration, except as otherwise indicated.

As illustrated, a user interface or user interface panel 334 may be provided on cooking appliance 300. Although shown at the front portion of cooking appliance 300, another suitable location or structure (e.g., a backsplash) for supporting user interface panel 334 may be provided in alternative embodiments. In some embodiments, user interface panel 334 includes input components or controls 336, such as one or more of a variety of electrical, mechanical, or electro-mechanical input devices. Controls 336 may include, for example, rotary dials, knobs, push buttons, and touch pads. A controller 510C is in communication with user interface panel 334 and controls 336 through which a user may select various operational features and modes and monitor progress of cooking appliance 300. In additional or alternative embodiments, user interface panel 334 includes a display component, such as a digital or analog display in communication with a controller 510C and configured to provide operational feedback to a user. In certain embodiments, user interface panel 334 represents a general purpose I/O ("GPIO") device or functional block.

As shown, controller 510C is communicatively coupled (i.e., in operative communication) with user interface panel 334 and its controls 336. Controller 510C may also be communicatively coupled with various operational components of cooking appliance 300 as well, such as heating elements (e.g., 326, 332), sensors, etc. Input/output ("I/O") signals may be routed between controller 510C and the various operational components of cooking appliance 300. Thus, controller 510C can selectively activate and operate these various components. Various components of cooking appliance 300 are communicatively coupled with controller 510C via one or more communication lines such as, for example, conductive signal lines, shared communication busses, or wireless communications bands.

In some embodiments, controller 510C includes one or more memory devices 514C and one or more processors 512C. The processors 512C can be any combination of general or special purpose processors, CPUs, or the like that can execute programming instructions or control code associated with operation of cooking appliance 300. The memory devices 514C (i.e., memory) may represent random access memory such as DRAM or read only memory such as ROM or FLASH. In one embodiment, the processor 512C executes programming instructions stored in memory 514C. The memory 514C may be a separate component from the processor 512C or may be included onboard within the processor 512C. Alternatively, controller 510C may be constructed without using a processor, for example, using a combination of discrete analog or digital logic circuitry (such as switches, amplifiers, integrators, comparators, flip-flops, AND gates, and the like) to perform control functionality instead of relying upon software.

In certain embodiments, controller 510C includes a network interface 520C such that controller 510C can connect to and communicate over one or more networks (e.g., network 502) with one or more network nodes. Controller 510C can also include one or more transmitting, receiving, or transceiving components for transmitting/receiving communications with other devices communicatively coupled with cooking appliance 300. Additionally or alternatively, one or more transmitting, receiving, or transceiving components can be located off board controller 510C. Generally, controller 510C can be positioned in any suitable location throughout cooking appliance 300. For example, controller 510C may be located proximate user interface panel 334 toward the front portion of cooking appliance 300.

As shown, one or more casings (e.g., hood casing 116) may be provided above cooking appliance 300 along the vertical direction V. For example, a hood casing 116 may be positioned above cooking appliance 300 in a stationary mounting (e.g., such that operation of interactive assembly 110 is not permitted unless casing 116 is mounted at a generally fixed or non-moving location). Hood casing 116 includes a plurality of outer walls and generally extends along the vertical direction V between a top end 118 and a bottom end 120; along the lateral direction L between a first side end 122 and a second side end 124; and along the transverse direction T between a front end 126 and a rear end 128. In some embodiments, hood casing 116 is spaced apart from cooking zone 320 or cooktop surface 324 along the vertical direction V. An open region 130 may thus be defined along the vertical direction V between cooking zone 320 or cooktop surface 324 and bottom end 120.

In optional embodiments, hood casing 116 is formed as a range hood. A ventilation assembly within hood casing 116 may thus direct an airflow from the open region 130 and through hood casing 116. However, a range hood is provided by way of example only. Other configurations may be used within the spirit and scope of the present disclosure. For example, hood casing 116 could be part of a microwave or other appliance designed to be located above cooking appliance 300 (e.g., directly above cooktop surface 324). Moreover, although a generally rectangular shape is illustrated, any suitable shape or style may be adapted to form the structure of hood casing 116.

In certain embodiments, one or more camera assemblies 114A, 114B are provided to capture images (e.g., static images or dynamic video) of a portion of cooking appliance 300 or an area adjacent to cooking appliance 300. Generally, each camera assembly 114A, 114B may be any type of device suitable for capturing a picture or video. As an example, each camera assembly 114A, 114B may be a video camera or a digital camera with an electronic image sensor [e.g., a charge coupled device (CCD) or a CMOS sensor]. A camera assembly 114A or 114B is generally provided in operable communication with controller 510A such that controller 510A may receive an image signal (e.g., video signal) from camera assembly 114A or 114B corresponding to the picture(s) captured by camera assembly 114A or 114B. Once received by controller 510A, the image signal (e.g., video signal) may be further processed at controller 510A (e.g., for viewing at image monitor 112) or transmitted to a separate device (e.g., remote server 404) "live" or in real-time for remote viewing (e.g., via one or more social media platforms). Optionally, one or more microphones (not pictured) may be associated with one or more of the camera assemblies 114A, 114B to capture and transmit audio signal(s) coinciding (or otherwise corresponding) with the captured image signal or picture(s).

Figure 5:
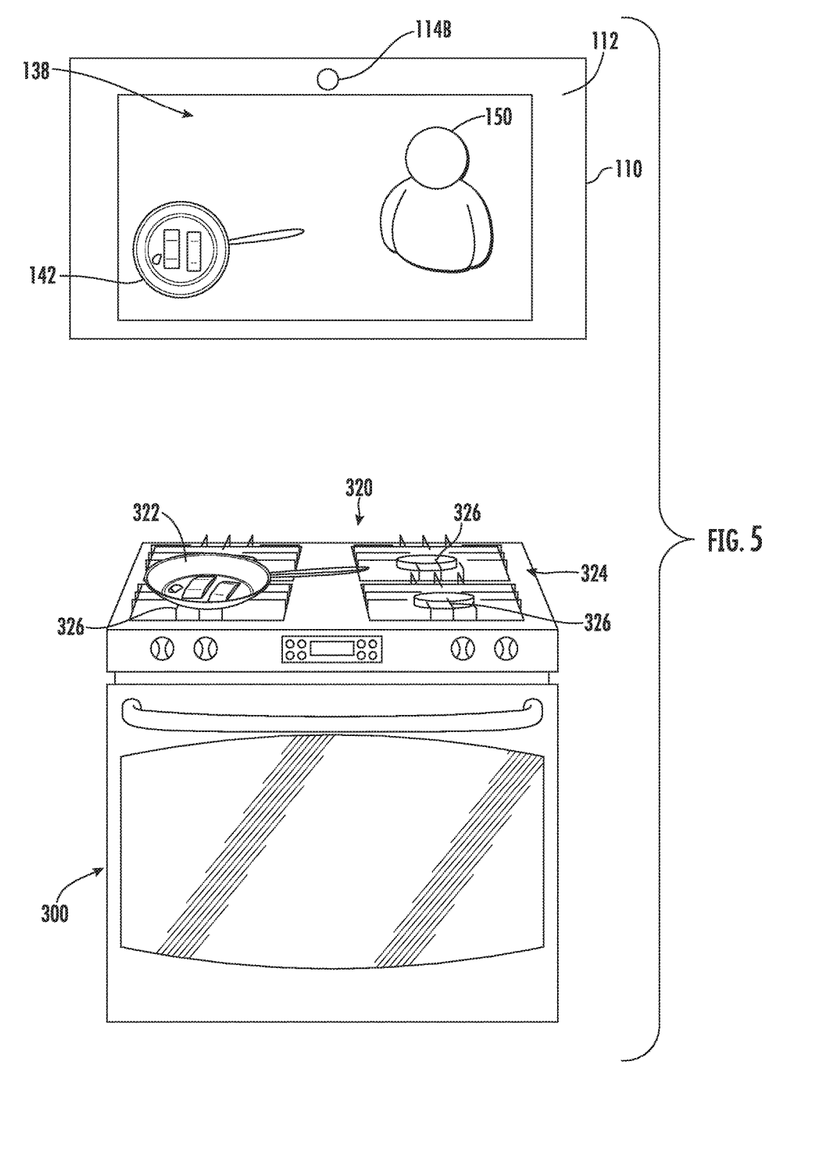
FIG. 5 provides a front perspective view of a system according to exemplary embodiments of the present disclosure.

In some embodiments, one camera assembly (e.g., first camera assembly 114A) is directed at cooking zone 320 (e.g., cooktop surface 324). In other words, first camera assembly 114A is oriented to capture light emitted or reflected from cooking zone 320 through the open region 130. In some such embodiments, first camera assembly 114A can selectively capture an image covering all or some of cooktop surface 324. For instance, first camera assembly 114A may capture an image covering one or more heating elements 326 of cooking appliance 300. In some such embodiments, the captured heating elements 326 and any utensil 322 placed on one of the heating elements 326 (or otherwise between cooking zone 320 and first camera assembly 114A) may be recorded and transmitted instantly to another portion of system (e.g., image monitor 112) as part of a real-time video feed. Thus, the real-time video feed may include a digital picture or representation 142 of the heating elements 326 or utensil 322 (e.g., as illustrated in FIG. 5). Optionally, first camera assembly 114A may be directed such that a line of sight is defined from first camera assembly 114A that is perpendicular to cooktop surface 324.

As shown, first camera assembly 114A is positioned above cooking zone 320 (e.g., along the vertical direction V). In some such embodiments, first camera assembly 114A is mounted (e.g., fixedly or removably) to hood casing 116. A cross-brace 132 extending across hood casing 116 (e.g., along the transverse direction T) may support first camera assembly 114A. When assembled, first camera assembly 114A may be positioned directly above cooking zone 320 or cooktop surface 324.

In additional or alternative embodiments, one camera assembly (e.g., second camera assembly 114B) is directed away from cooking zone 320 or cooktop surface 324. In other words, second camera assembly 114B is oriented to capture light emitted or reflected from an area other than cooktop surface 324. In particular, second camera assembly 114B may be directed at the area in front of cooking appliance 300 (e.g., directly forward from cooking appliance 300 along the transverse direction T). Thus, second camera assembly 114B may selectively capture an image of the area in front of cooking zone 320. This area may correspond to or cover the location where a user would typically stand during use of cooking appliance 300. During use, a user's face or body may be captured by second camera assembly 114B while the user is standing directly in front of cooking appliance 300. Optionally, second camera assembly 114B may be directed such that a line of sight is defined from second camera assembly 114B that is non-orthogonal to cooktop surface 324 (e.g., between 0° and 45° relative to a plane parallel to cooktop surface 324). The captured images from second camera assembly 114B may be suitable for transmission to a remote device or may be processed as part of one or more operations of interactive assembly 110, such as a gesture control signal for a portion of interactive assembly 110 (e.g., to engage a graphical user interface displayed at image monitor 112).

As shown, second camera assembly 114B is positioned above cooking appliance 300 (e.g., along the vertical direction V). In some such embodiments, such as that illustrated in FIGS. 1 and 2, second camera assembly 114B is mounted (e.g., fixedly or removably) to a front portion of hood casing 116 (e.g., at image monitor 112). When assembled, second camera assembly 114B may be positioned directly above a portion of cooking appliance 300 (e.g., cooking zone 320 or cooktop surface 324) or, additionally, forward from cooking appliance 300 along the transverse direction T.

In optional embodiments, a lighting assembly 134 is provided above cooktop surface 324 (e.g., along the vertical direction V). For instance, lighting assembly 134 may be mounted to hood casing 116 (e.g., directly above cooking zone 320 or cooktop surface 324). Generally, lighting assembly 134 includes one or more selectable light sources directed toward cooking zone 320. In other words, lighting assembly 134 is oriented to project a light (as indicated at arrows 136) to cooking appliance 300 through open region 130 and illuminate at least a portion of cooking zone 320 (e.g., cooktop surface 324). The light sources may include any suitable light-emitting elements, such as one or more light emitting diode (LED), incandescent bulb, fluorescent bulb, halogen bulb, etc.

During use, lighting assembly 134 may be selectively activated to illuminate a portion of cooking appliance 300 (e.g., cooktop surface 324) based on a received light visibility signal. For instance, lighting assembly 134 may be activated by controller 510A based on direct user input (e.g., depressing a dedicated switch, a gesture control signal, a voice control signal, etc.). In other words, the light visibility signal may be an isolated user input signal.

Alternatively, the light visibility signal may be an automatically-generated signal that does not require direct user input. The light visibility signal may indicate additional light is needed above cooking appliance 300. In turn, controller 510A may automatically activate lighting assembly 134 based on a determined condition. Optionally, controller 510A may vary the activation or light intensity (i.e., luminance) of the light 136 from lighting assembly 134 based on the ambient conditions (e.g., through the open region 130 between cooking zone 320 and hood casing 116). For instance, an ambient light sensor 115 may be positioned above cooking zone 320 (e.g., directly above cooktop surface 324). In some such embodiments, ambient light sensor 115 detects the light available at first camera assembly 114A and transmits a corresponding light visibility signal to controller 510A. Based on the received light visibility signal, controller 510A may direct lighting assembly 134 to activate/deactivate or increase/decrease the intensity of light 136 projected towards cooking appliance 300.

In some embodiments, image monitor 112 is provided above cooking zone 320 (e.g., along the vertical direction V). For instance, image monitor 112 may be mounted to hood casing 116 (e.g., directly above cooking appliance 300, cooking zone 320, or cooktop surface 324). Generally, image monitor 112 may be any suitable type of mechanism for visually presenting a digital image. For example, image monitor 112 may be a liquid crystal display (LCD), a plasma display panel (PDP), a cathode ray tube (CRT) display, etc. Thus, image monitor 112 includes an imaging surface 138 (e.g., screen or display panel) at which the digital image is presented or displayed as an optically-viewable picture (e.g., static image, dynamic or moving video, etc.) to a user. The optically-viewable picture may correspond to any suitable signal or data received or stored by interactive assembly 110 (e.g., at controller 510A). As an example, image monitor 112 may present one or more animated or dynamic figures 150 (e.g., cartoon characters, movable icons, or other suitable controller-generated objects that can be presented on a digital display). As another example, image monitor 112 may present a remotely captured image, such as a live (e.g., real-time) dynamic video stream received from a separate portion or element of system 100. As yet another example, image monitor 112 may present a graphical user interface (GUI) that allows a user to select or manipulate various operational features of interactive assembly 110 or cooking appliance 300. During use of such GUI embodiments, a user may engage, select, or adjust the image presented at image monitor 112 through any suitable input, such as gesture controls detected through second camera assembly 114B, voice controls detected through one or more microphones, associated touch panels (e.g., capacitance or resistance touch panel) or sensors overlaid across imaging surface 138, etc.

As illustrated, the imaging surface 138 generally faces, or is directed, away from cooking appliance 300 (e.g., away from cooking zone 320 or cabinet 310). In particular, the imaging surface 138 is directed toward the area forward from the cooking appliance 300. During use, a user standing in front of cooking appliance 300 may thus see the optically-viewable picture (e.g., video stream, dynamic FIG. 150, graphical user interface, etc.) displayed at the imaging surface 138. Optionally, the imaging surface 138 may be positioned at a rearward non-orthogonal angle relative to the vertical direction V. In other words, the imaging surface 138 may be inclined such that an upper edge of the imaging surface 138 is closer to the rear end 128 of hood casing 116 than a lower edge of the imaging surface 138 is. In some such embodiments, the non-orthogonal angle is between 1° and 15° relative to the vertical direction V. In certain embodiments, the non-orthogonal angle is between 2° and 7° relative to the vertical direction V.

Figure 1:
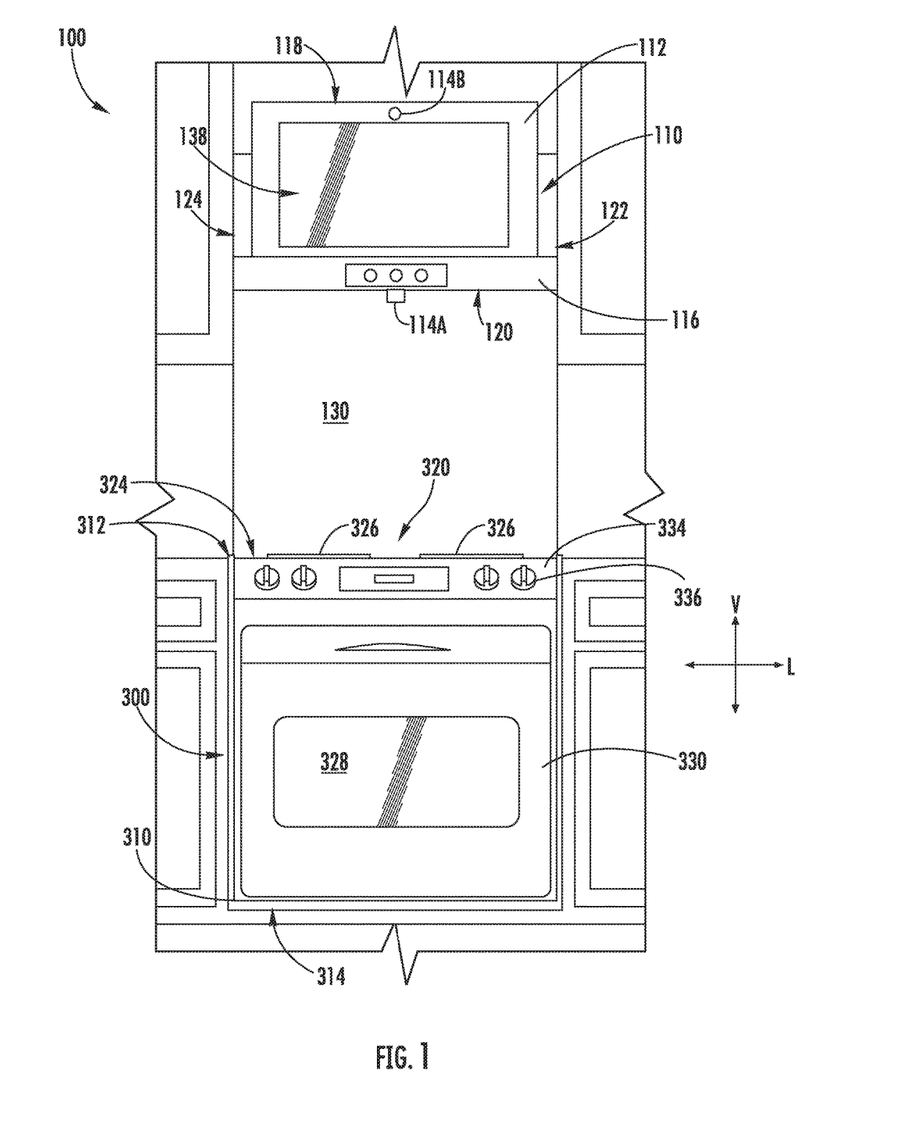
FIG. 1 provides a front perspective view of a system according to exemplary embodiments of the present disclosure.
Figure 2:
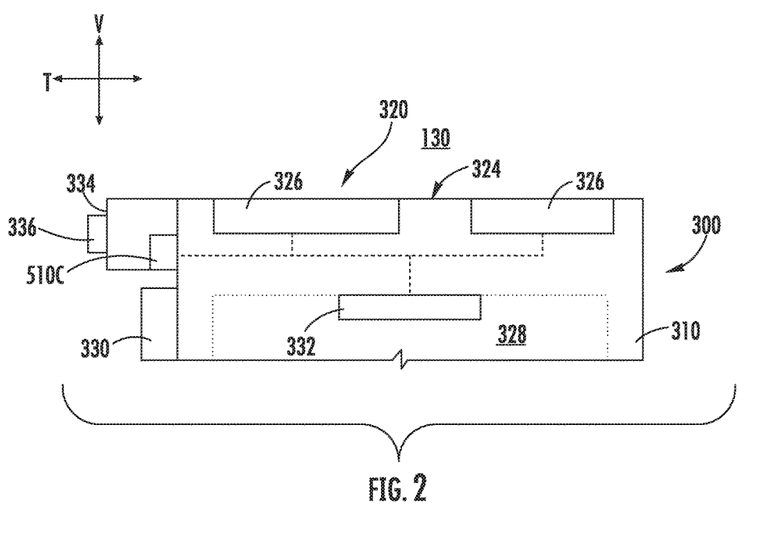
FIG. 2 provides a side schematic view of the exemplary system of FIG. 1.
Figure 3:
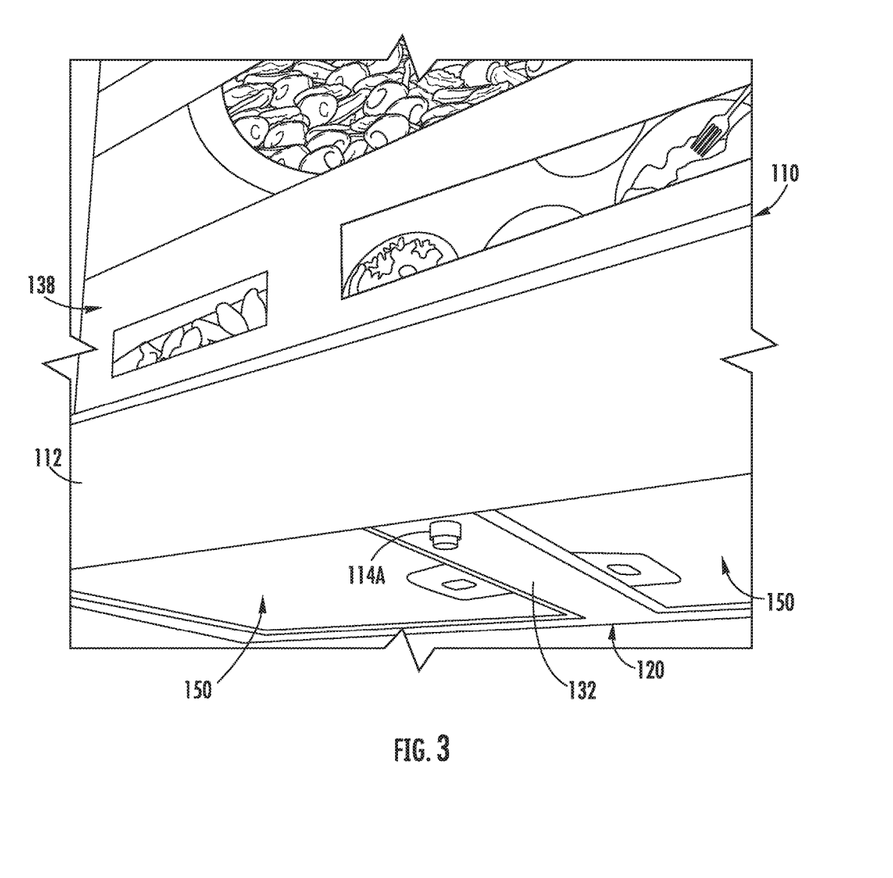
FIG. 3 provides a bottom perspective view of a portion of the exemplary system of FIG. 1.
Figure 4:
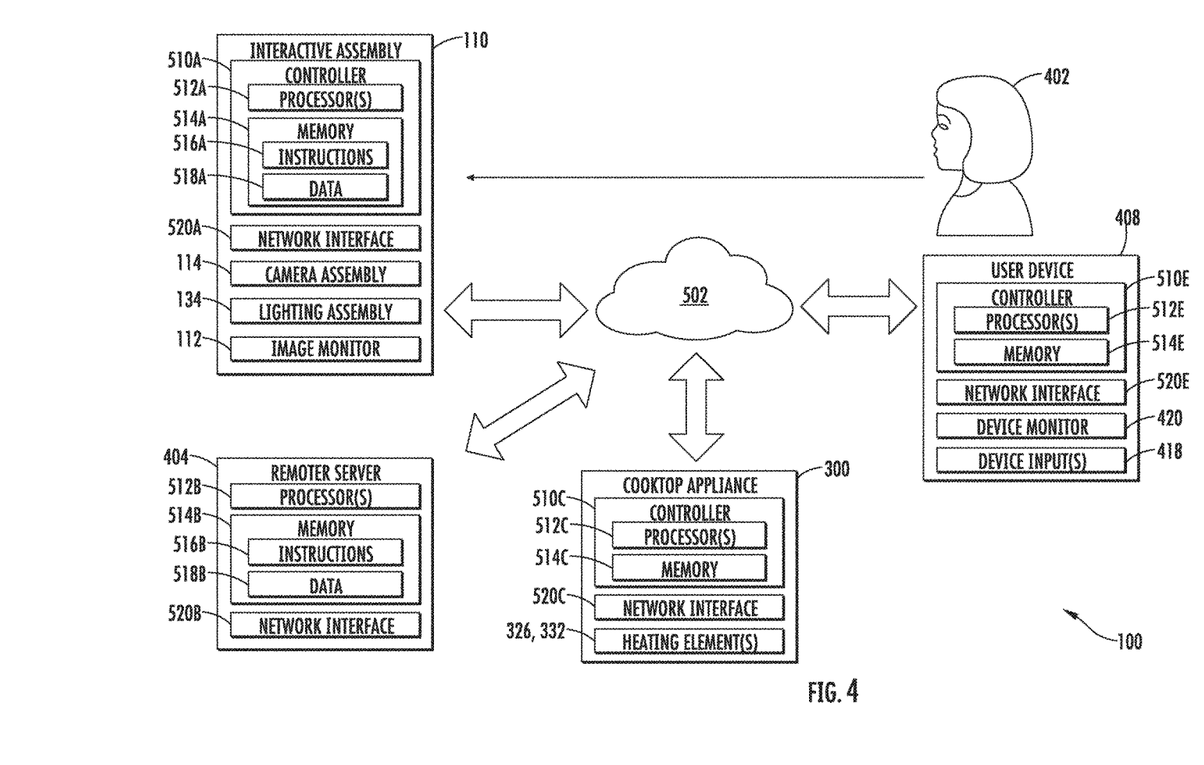
FIG. 4 provides a schematic view of a system for user engagement according to exemplary embodiments of the present disclosure.

FIG. 4 provides a schematic view of a system 100 for user engagement according to exemplary embodiments of the present disclosure. As shown, interactive assembly 110 can be communicatively coupled with network 502 and various other nodes, such as a remote server 404, cooking appliance 300, and one or more user devices 408. Moreover, one or more users 402 can be in operative communication with interactive assembly 110 by various methods, including voice control or gesture recognition, for example. Additionally, or alternatively, although network 502 is shown, one or more portions of the system (e.g., interactive assembly 110, cooking appliance 300, user device 408, or other devices within system) may be communicatively coupled without network 502; rather, interactive assembly 110 and various other devices of the system can be communicatively coupled via any suitable wired or wireless means not over network 502, such as, for example, via physical wires, transceiving, transmitting, or receiving components.

As noted above, interactive assembly 110 may include a controller 510A operably coupled to one or more camera assemblies 114, lighting assemblies 134, and image monitors 110. Controller 510A may include one or more processors 512A and one or more memory devices 514A (i.e., memory). The one or more processors 512A can be any suitable processing device (e.g., a processor core, a microprocessor, an ASIC, a FPGA, a microcontroller, etc.) and can be one processor or a plurality of processors that are operatively connected. The memory device 514A can include one or more non-transitory computer-readable storage mediums, such as RAM, ROM, EEPROM, EPROM, flash memory device, magnetic disks, etc., and combinations thereof. The memory devices 514A can store data 518A and instructions 516A that are executed by the processor 512A to cause interactive assembly 110 to perform operations. For example, instructions 516A could be instructions for voice recognition, instructions for gesture recognition, receiving/transmitting images or image signals from camera assembly 114, directing activation of lighting assembly 134, or projecting images at image monitor 112. The memory devices 514A may also include data 518A, such as captured image data, notification or message data, etc., that can be retrieved, manipulated, created, or stored by processor 512A.

Controller 510A includes a network interface 520A such that interactive assembly 110 can connect to and communicate over one or more networks (e.g., network 502) with one or more network nodes. Network interface 520A can be an onboard component of controller 510A or it can be a separate, off board component. Controller 510A can also include one or more transmitting, receiving, or transceiving components for transmitting/receiving communications with other devices communicatively coupled with interactive assembly 110. Additionally or alternatively, one or more transmitting, receiving, or transceiving components can be located off board controller 510A.

Network 502 can be any suitable type of network, such as a local area network (e.g., intranet), wide area network (e.g., internet), low power wireless networks [e.g., Bluetooth Low Energy (BLE)], or some combination thereof and can include any number of wired or wireless links. In general, communication over network 502 can be carried via any type of wired or wireless connection, using a wide variety of communication protocols (e.g., TCP/IP, HTTP, SMTP, FTP), encodings or formats (e.g., HTML, XML), or protection schemes (e.g., VPN, secure HTTP, SSL).

In some embodiments, a remote server 404, such as a web server, is in operable communication with interactive assembly 110. The server 404 can be used to host a social media platform (e.g., FACEBOOK™, INSTAGRAM™, SNAPCHAT™, TWITTER™, etc.). In other words, remote server 404 may be a social media platform server. Additionally or alternatively, the server 404 can be used to host an information database. The server can be implemented using any suitable computing device(s). The server 404 may include one or more processors 512B and one or more memory devices 514B (i.e., memory). The one or more processors 512B can be any suitable processing device (e.g., a processor core, a microprocessor, an ASIC, a FPGA, a microcontroller, etc.) and can be one processor or a plurality of processors that are operatively connected. The memory device 512B can include one or more non-transitory computer-readable storage mediums, such as RAM, ROM, EEPROM, EPROM, flash memory devices, magnetic disks, etc., and combinations thereof. The memory devices 514B can store data 518B and instructions 516B which are executed by the processor 512B to cause remote server 404 to perform operations. For example, instructions 516B could be instructions for receiving/transmitting images or image signals, transmitting/receiving recipe signals, etc.

The memory devices 514B may also include data 518B, such as social media data, notification data, message data, image data, etc., that can be retrieved, manipulated, created, or stored by processor 512B. The data 518B can be stored in one or more databases. The one or more databases can be connected to remote server 404 by a high bandwidth LAN or WAN, or can also be connected to remote server 404 through network 502. The one or more databases can be split up so that they are located in multiple locales.

Remote server 404 includes a network interface 520B such that interactive remote server 404 can connect to and communicate over one or more networks (e.g., network 502) with one or more network nodes. Network interface 520B can be an onboard component or it can be a separate, off board component. In turn, remote server 404 can exchange data with one or more nodes over the network 502. In particular, remote server 404 can exchange data with interactive assembly 110. It is understood that remote server 404 may further exchange data with any number of client devices over the network 502. The client devices can be any suitable type of computing device, such as a general-purpose computer, special purpose computer, laptop, desktop, integrated circuit, mobile device, smartphone, tablet, or other suitable computing device. In the case of a social media platform, images (e.g., static images or dynamic video), audio, or text may thus be exchanged between interactive assembly 110 and various separate client devices through remote server 404.

In optional embodiments, cooking appliance 300 is in operable communication with interactive assembly 110 via network 502. In turn, controller 510C of cooking appliance 300 may exchange signals with interactive assembly 110. Optionally, one or more portions of cooking appliance 300 may be controlled according to signals received from controller 510A of interactive assembly 110. For instance, one or more heating elements 326, 332 of cooking appliance 300 may be activated or directed to a specific heat output (e.g., in units of British Thermal Units or temperature) based on one or more instruction signals received from controller 510A of interactive assembly 110 or remote server 404.

In certain embodiments, a user device 408 is communicatively coupled with network 502 such that user device 408 can communicate with interactive assembly 110. User device 408 can communicate directly with interactive assembly 110 via network 502. Alternatively, user 402 can communicate indirectly with interactive assembly 110 by communicating via network 502 with remote server 404, which in turn communicates with interactive assembly 110 via network 502. Moreover, user 402 can be in operative communication with user device 408 such that user 402 can communicate with interactive assembly 110 via user device 408.

User device 408 can be any type of device, such as, for example, a personal computing device (e.g., laptop or desktop), a mobile computing device (e.g., smartphone or tablet), a gaming console or controller, a wearable computing device, an embedded computing device, a remote, or any other suitable type of user computing device. User device 408 can include one or more user device controllers 510E. Controller 510E can include one or more processors 512E and one or more memory devices 514E. The one or more processors 512E can be any suitable processing device (e.g., a processor core, a microprocessor, an ASIC, a FPGA, a controller, a microcontroller, etc.) and can be one processor or a plurality of processors that are operatively connected. The memory device (i.e., memory) can include one or more non-transitory computer-readable storage mediums, such as RAM, ROM, EEPROM, EPROM, flash memory devices, magnetic disks, etc., and combinations thereof. The memory can store data and instructions which are executed by the processor 512E to cause user device 408 to perform operations. Controller 510E may include a user device network interface 520E such that user device 408 can connect to and communicate over one or more networks (e.g., network 502) with one or more network nodes. Network interface 520E can be an onboard component of controller 510E or it can be a separate, off board component. Controller 510E can also include one or more transmitting, receiving, or transceiving components for transmitting/receiving communications with other devices communicatively coupled with user device 408. Additionally or alternatively, one or more transmitting, receiving, or transceiving components can be located off board controller 510E.

User device 408 can include one or more user inputs 418 (e.g., buttons, knobs, one or more cameras, etc.) or a monitor 420 configured to display graphical user interfaces or other visual representations to user. For example, monitor 420 can display graphical user interfaces corresponding to operational features of interactive assembly 110 such that user may manipulate or select the features to operate interactive assembly 110. Monitor 420 can be a touch sensitive component (e.g., a touch-sensitive display screen or a touch pad) that is sensitive to the touch of a user input object (e.g., a finger or a stylus). For example, a user 402 may touch the monitor 420 with his or her finger and type in a series of numbers on the monitor 420. In addition, motion of the user input object relative to the monitor 420 can enable user 402 to provide input to user device 408. User device 408 may provide other suitable methods for providing input to user device 408 as well. Moreover, user device 408 can include one or more speakers, one or more cameras, or more than one microphones such that user device 408 is configured with voice control, motion detection, and other functionality.

Generally, user 402 may be in operative communication with interactive assembly 110, cooking appliance 300, or one or more user devices 408. In some exemplary embodiments, user 402 can communicate with devices (e.g., interactive assembly 110) using voice control. User 402 may also be in operative communication via other methods as well, such as visual communication.

Figure 6:
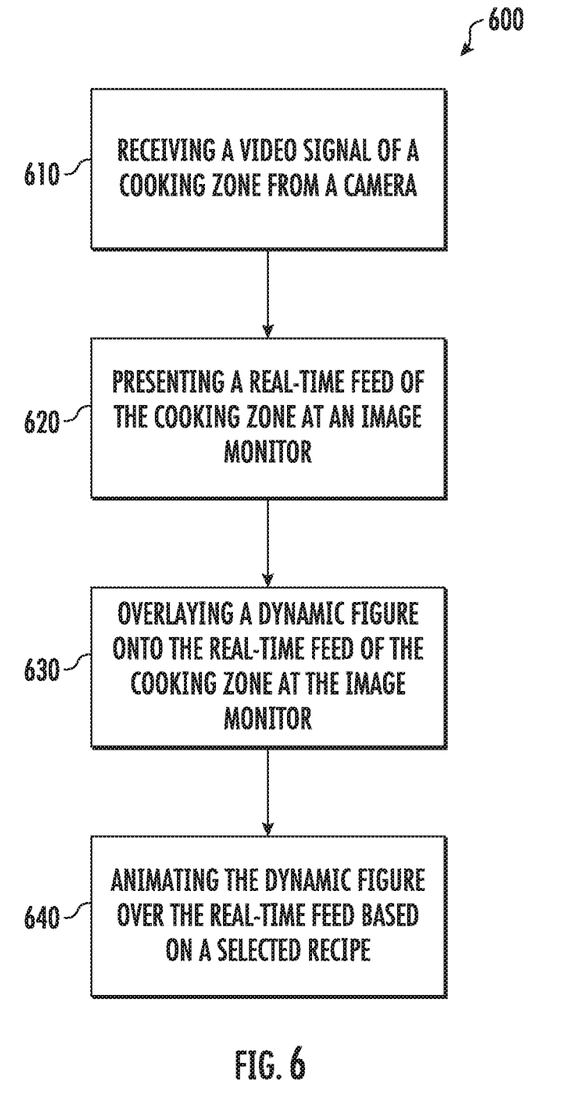
FIG. 6 provides a flow chart illustrating a method of operating a system according to exemplary embodiments of the present disclosure.

Referring now to FIG. 6, various methods may be provided for use with system 100 (FIG. 1) in accordance with the present disclosure. In general, the various steps of methods as disclosed herein may, in exemplary embodiments, be performed by the controller 510A (FIG. 4) as part of an operation that the controller 510A is configured to initiate (e.g., a directed cooking operation). During such methods, controller 510A may receive inputs and transmit outputs from various other components of the system 100. For example, controller 510A may send signals to and receive signals from remote server 404, cooking appliance 300, or user device 408, as well as other components within interactive assembly 110 (FIG. 4). In particular, the present disclosure is further directed to methods, as indicated by 600, for operating system 100. Such methods advantageously facilitate guided or interactive cooking instruction adjacent to cooking appliance 300. In certain embodiments, such methods may advantageously facilitate easy-to-understand, augmented-reality cooking instruction while a user is actively engaged with (e.g., using) cooking appliance 300.

FIG. 6 depicts steps performed in a particular order for purpose of illustration and discussion. Those of ordinary skill in the art, using the disclosures provided herein, will understand that (except as otherwise indicated) the steps of any of the methods disclosed herein can be modified, adapted, rearranged, omitted, or expanded in various ways without deviating from the scope of the present disclosure.

As shown in FIG. 6, at 610, method 600 includes receiving a video signal of the cooking zone from a camera assembly (e.g., first camera assembly) of the interactive assembly. As described above, the camera assembly may be positioned directly above the cooking zone or cooktop surface of the cooking appliance. Moreover, the camera assembly may be directed toward the cooking zone (e.g., to capture portion of the cooktop surface that includes one or more individual heating elements, which may receive cooking utensil thereon). Thus, the video signal may generally correspond to portion of the cooktop surface. As would be understood, the video signal may include multiple sequenced images captured by the camera assembly. In some embodiments, the captured video signal is transmitted in real-time (e.g., continuously or instantly). For instance, the video signal may be received by the controller of the interactive assembly or another node of the system (e.g., the remote server). Optionally, a real-time dynamic video signal or stream may be transmitted based on a view or image detected at the camera assembly. Additionally or alternatively, multiple image signals (e.g., separate image signals or streams from a first camera assembly and a second camera assembly) may be transmitted simultaneously.

At 620, method 600 includes presenting a real-time feed of the cooking zone at the image monitor of the interactive assembly. In particular, the real-time feed may be presented according to the received video signal at 610. As noted above, the image monitor may be mounted or positioned above the cooking zone. Thus, the real-time feed may provide live video (e.g., continuously-updating digital images) that a user may view on the image monitor in front of the cooking zone (e.g., while using the cooking appliance). As would be understood, the real-time video feed present at the image monitor may extend across the entirety of the display surface of the image monitor or, alternatively, merely cover a subportion of the display surface such that the real-time video feed based on the received video signal at 610 is presented beside, behind, or within another digital image (e.g., border frame, GUI, separate video feed, etc.).

At 630, the method 600 includes overlaying dynamic figure onto the real-time feed of the cooking zone at image monitor. Thus, as would be understood, the dynamic figure overlaid onto the real-time feed of the cooking zone may appear as a character or object, as described above positioned in front of the digital representation (i.e., video) of the cooking zone on the image monitor. During use, at least a portion of the cooking zone may still be visible on the image monitor even while the dynamic figure is also visible. In other words, the dynamic figure will not completely cover or span the portion of the display surface on which the cooking zone is represented or presented at the image monitor. In this manner, the dynamic figure may serve as an augmentation to or augmented reality component for the real-time video feed.

In some embodiments, either prior to or subsequent to 630, the predetermined recipe may be selected by the user. For instance, the recipe selection signal may be transmitted to the interactive assembly from an input portion of the interactive assembly, a user device, the cooking appliance, or another portion of the system.

Generally, the recipe selection signal may indicate that the user intends to follow the predetermined or selected recipe in order to cook or create a specific food dish or item. The predetermined recipe may be stored locally on the interactive assembly, remotely at the remote server of the system, or remotely from an intermediate remote server (e.g., third-party remote server). Moreover, the predetermined recipe may be in the form of text, media (e.g., static images, dynamic video, audio, etc.), hyperlinks, animation instructions, or some combination thereof. For instance, along with text data listing various cooking steps, the predetermined recipe may include animation instructions to illustrate specific cooking steps with the dynamic figure and guide a user in following the predetermined recipe. In some such embodiments, the predetermined recipe is transmitted as a recipe information signal (e.g., from the remote server) in response to the predetermined recipe being selected at the interactive assembly. Optionally, all of the associated or related information (e.g., all of the recipe data, cooking steps, animation instructions, etc.) for the selected predetermined recipe may be transmitted to the interactive assembly (e.g., as a recipe signal). Advantageously, the information may be locally stored (e.g., temporarily) on the interactive assembly during execution of the directed cooking operation or method 600, thereby preventing lag in operation of the interactive assembly without overburdening the storage requirements at the interactive assembly.

At 640, the method 600 includes animating the dynamic figure over the real-time feed based on the selected recipe.

For instance, the dynamic figure may move or otherwise change shape as presented on the image monitor according to received animation instructions corresponding to the selected recipe. In exemplary embodiments, 640 includes displaying or animating the dynamic figure over portion of the real-time feed at which an individual heating element is located (e.g., at which the individual heating element represented as a digital image). Thus, the dynamic figure may simulate engagement with the individual heating element or a cooking utensil positioned on the individual heating element. A simulated engagement may show specific user actions being performed (e.g., cooking steps, such as turning on the heating assembly, placing/adjusting a utensil on the heating element, etc.) such that a user may quickly and advantageously understand how the specific actions are to be copied (e.g., performed by the user). In other words, 640 may include animating the dynamic figure as illustrating a user action of the selected recipe.

In further embodiments, 640 includes displaying the dynamic figure over a portion of the real-time feed at which a utensil is located (e.g., as presented at image monitor). In particular, 640 may include animating the dynamic figure as illustrating a user action to be performed on utensil. For instance, the dynamic figure may be animated such that engagement between the dynamic figure and utensil is simulated, thereby augmenting the real-time video feed on the cooking appliance. In some such embodiments, the method 600 includes recognizing one or more physical objects, such as the cooking utensil (e.g., based on the video signal and constituent images thereof received at 610). In particular, the cooking utensil may be recognized. As will be understood, recognizing the cooking utensil, may be performed by edge matching, divide-and-conquer search, greyscale matching, histograms of receptive field responses, or another suitable routine (e.g., executed at the interactive assembly). Recognition of the cooking utensil may continue even as cooking utensil is moved within the area covered by the cooking zone and presented at image monitor. Thus, animation of the dynamic figure may accurately simulate user action in the area or portion of the real-time feed on the image monitor at which the cooking utensil is visible.

In certain embodiments, method 600 further includes detecting a heat setting at one or more of the heating elements that are visible or represented at the image monitor. For instance, the interactive assembly may receive a heating signal corresponding to the setting for the heating element is selected at the cooking appliance. Additionally or alternatively, a temperature signal may be received from a temperature sensor configured to directly detect the temperature at the heating element. Based on the detected heat setting, the method 600 (e.g., at 640) may include illustrating manipulation of the heating element. For instance, the dynamic figure may simulate activating the heating element, increasing heat at the heating element, decreasing heat at the heating element, etc.

Along with the dynamic figure and real-time video feed, the images that are presented at the image monitor may be based on or dictated by one or more further received signals. In optional embodiments, method 600 may include presenting an interactive image at image display. The interactive image may be prompted by (e.g., in response to) or based on a received remote image signal, recipe signal, or control input signal. As described above, the remote image signal may include, for example, data regarding a remote dynamic video stream transmitted from a separate user device, secondary appliance, etc. The recipe signal may include, for example, data regarding a food item, and may be stored locally or received from a separate remote server. The control input signal may include, for example, data regarding gesture signals received from a camera assembly. In some embodiments, the method 600 includes presenting a remotely captured image, such as a live (e.g., real-time) dynamic video stream, recipe information, or a graphical user interface that a user may engage through one or more recognized gestures.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A user engagement system comprising:
 a camera assembly directed at a cooking zone;
 an image monitor directed at an area forward from the cooking zone; and
 a controller in operative communication with the camera assembly and the image monitor, wherein the controller is configured to initiate a directed cooking operation, the directed cooking operation comprising:
  receiving a video signal of the cooking zone from the camera assembly,
  presenting a real-time feed of the cooking zone at the image monitor according to the received video signal,
  overlaying a dynamic figure onto the real-time feed of the cooking zone at the image monitor, and
  animating the dynamic figure over the real-time feed based on a selected recipe,
  receiving a recipe information signal from a remote server based on the selected recipe prior to animating the dynamic figure, wherein the recipe information signal includes animation instructions for animating the dynamic figure.

2. The user engagement system of claim 1, wherein the cooking zone is a cooktop of a cooking appliance, and wherein the cooktop comprises a heating element for receiving a utensil thereon.

3. The user engagement system of claim 2, further comprising detecting a heat setting at the heating element, wherein animating the dynamic figure includes animating the dynamic figure as illustrating manipulation of the heating element based on the detected heat setting.

4. The user engagement system of claim 2, wherein animating comprises displaying the dynamic figure over a portion of the real-time feed at which the heating element is located.

5. The user engagement system of claim 2, wherein animating comprises displaying the dynamic figure over a portion of the real-time feed at which the utensil is located, and wherein animating the dynamic figure comprises simulating engagement between the dynamic figure and the utensil.

6. The user engagement system of claim 5, wherein animating further comprises animating the dynamic figure as illustrating a user action of the selected recipe.

7. The user engagement system of claim 1, wherein the camera assembly is positioned directly above the cooking zone.

8. The user engagement system of claim 1, wherein the image monitor is positioned directly above the cooking zone.

9. A method of operating a user engagement system adjacent to a cooking zone, the user engagement system comprising a camera assembly and an image monitor, the method comprising:

receiving a video signal of the cooking zone from the camera assembly;

presenting a real-time feed of the cooking zone at the image monitor according to the received video signal;

overlaying a dynamic figure onto the real-time feed of the cooking zone at the image monitor;

animating the dynamic figure over the real-time feed based on a selected recipe; and receiving a recipe information signal from a remote server based on the selected recipe prior to animating the dynamic figure, wherein the recipe information signal includes animation instructions for animating the dynamic figure.

10. The method of claim 9, wherein the cooking zone is a cooktop of a cooking appliance, and wherein the cooktop comprises a heating element for receiving a utensil thereon.

11. The method of claim 10, further comprising detecting a heat setting at the heating element, wherein animating the dynamic figure includes animating the dynamic figure as illustrating manipulation of the heating element based on the detected heat setting.

12. The method of claim 10, wherein animating comprises displaying the dynamic figure over a portion of the real-time feed at which the heating element is located.

13. The method of claim 10, wherein animating comprises displaying the dynamic figure over a portion of the real-time feed at which the utensil is located, and wherein animating the dynamic figure comprises simulating engagement between the dynamic figure and the utensil.

14. The method of claim 13, wherein animating further comprises animating the dynamic figure as illustrating a user action of the selected recipe.

15. The method of claim 9, wherein the camera assembly is positioned directly above the cooking zone.

16. The method of claim 9, wherein the image monitor is positioned directly above the cooking zone.

* * * * *